United States Patent
Kupwade Patil et al.

(10) Patent No.: US 11,323,249 B2
(45) Date of Patent: May 3, 2022

(54) CRYPTOGRAPHIC METHODS AND SYSTEMS FOR AUTHENTICATION IN CONNECTED VEHICLE SYSTEMS AND FOR OTHER USES

(71) Applicant: LG Electronics Inc., Seoul (KR)

(72) Inventors: Harsh Kupwade Patil, Fremont, CA (US); Arunkumaar Ganesan, Ann Arbor, MI (US)

(73) Assignee: LG ELECTRONICS, INC., Seoul (KR)

(*) Notice: Subject to any disclaimer, the term of this patent is extended or adjusted under 35 U.S.C. 154(b) by 140 days.

(21) Appl. No.: 16/955,546

(22) PCT Filed: Dec. 19, 2018

(86) PCT No.: PCT/KR2018/016171
§ 371 (c)(1),
(2) Date: Jun. 18, 2020

(87) PCT Pub. No.: WO2019/124953
PCT Pub. Date: Jun. 27, 2019

(65) Prior Publication Data
US 2020/0322135 A1 Oct. 8, 2020

Related U.S. Application Data

(60) Provisional application No. 62/607,915, filed on Dec. 20, 2017.

(51) Int. Cl.
*H04L 9/08* (2006.01)
*H04L 9/30* (2006.01)
*H04L 9/32* (2006.01)

(52) U.S. Cl.
CPC .............. *H04L 9/083* (2013.01); *H04L 9/085* (2013.01); *H04L 9/0847* (2013.01); *H04L 9/3073* (2013.01); *H04L 9/3247* (2013.01); *H04L 9/3268* (2013.01); *H04L 2209/16* (2013.01); *H04L 2209/42* (2013.01); *H04L 2209/805* (2013.01); *H04L 2209/84* (2013.01)

(58) Field of Classification Search
CPC ....... H04L 9/083; H04L 9/085; H04L 9/3073; H04L 2208/16; H04L 2208/84
See application file for complete search history.

(56) References Cited

U.S. PATENT DOCUMENTS

| | | | |
|---|---|---|---|
| 2010/0208895 A1* | 8/2010 | Boneh | H04L 9/0847 380/278 |
| 2013/0191632 A1* | 7/2013 | Spector | H04L 9/0847 713/155 |
| 2016/0006723 A1 | 1/2016 | Wilson | |

(Continued)

OTHER PUBLICATIONS

Rigazzi, Giovanni, et al., "Optimized Revocation list Distribution for Secure V2X Communications," 2017 IEEE 86th Vehicular Technology Conference (VTC—Fall), IEEE Xplore,Sep. 27, 2017.

*Primary Examiner* — David J Pearson
(74) *Attorney, Agent, or Firm* — Duane Morris LLP; Philip Woo

(57) ABSTRACT

Cryptographic authentication is described to improve security in connected vehicle systems and other applications. Identity Based Cryptography and threshold cryptography are among techniques used in some embodiments.

20 Claims, 12 Drawing Sheets

(56) References Cited

U.S. PATENT DOCUMENTS

| | | |
|---|---|---|
| 2017/0132477 A1 | 5/2017 | Kim et al. |
| 2017/0195123 A1 | 7/2017 | Oberheide et al. |
| 2017/0272244 A1 | 9/2017 | Garcia Morchon et al. |
| 2019/0123915 A1* | 4/2019 | Simplicio, Jr. ..... H04L 63/0823 |

* cited by examiner

FIG. 10

TABLE 1
BONEH-FRANKLIN IDENTITY- BASED ENCRYPTION SCHEME

| Step | Details | Description |
|---|---|---|
| Setup | $P \in E/E_p$<br>$s \in Z_q^*$<br>$P_{pub} = sP$<br>$H : F_{p^2} \to 0, 1^n$<br>$G : 0, 1^* \to E/E_p$ | The PKG generates public parameters which will be used for encryption and decryption. s is a secret key which is only known to the PKG. |
| Extract | Given $ID \in 0, 1^*$, generate<br>$Q_{ID} = G(ID) \in E/E_p$.<br>Generate private key $d_{ID} = sQ_{ID}$ | The PKG generates a private key for this ID |
| Encrypt | Given message $M \in 0, 1^n$, and receiver ID ID, generate $Q_{ID}$. Choose random $r \in Z_q$, Set cipher text to :<br>$C = \{rP, M \oplus H(ê(Q_{ID}, P_{pub})^r)\}$ | ê is a bilineat, non-generate pairing that maps two points on the elliptic curve to a point on the field. For example, a Wail or Tate pairing can be used. |
| Decrypt | Given $C = (U, V)$, decrypt using:<br>$M = V \oplus H(ê(d_{ID}, U))$ | Successful encryption and decryption relies on the bilinear property. |

CRYPTOGRAPHIC METHODS AND SYSTEMS FOR AUTHENTICATION IN CONNECTED VEHICLE SYSTEMS AND FOR OTHER USES

CROSS-REFERENCE TO RELATED APPLICATIONS

This application is a § 371 national stage entry of International Application No. PCT/KR2018/016171, filed on Dec. 19, 2018, which claims priority to U.S. Provisional Application No. 62/607,915, filed Dec. 20, 2017, the entireties of which are incorporated herein by reference.

TECHNICAL FIELD

The present invention relates to secure communications, including transportation-related communications among cars, trucks, trains, and possibly other vehicles, as well as pedestrians' smart phones, traffic lights, and other infrastructure.

BACKGROUND ART

In recent times, there has been a surge in digital technologies embedded in physical objects, leading to what is today known as Internet of Things (IoT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

Ensuring that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to a given (sending) vehicle. The certificates are distributed by trusted computer entities called Certificate Authorities (CAs). Each certificate is signed by the CA, allowing the message recipient to verify the CAs signature to confirm the certificate's authenticity.

In order to preserve the sending vehicle's anonymity, the sending vehicle's certificate identifies the sending vehicle by a pseudonym that is not traceable to the vehicle. The sending vehicle has multiple pseudonyms issued by a CA. The vehicle uses different pseudonyms for different messages. Hence, the message recipients cannot determine if the messages come from the same vehicle. The sending vehicle is therefore difficult to trace.

However, each pseudonym requires a separate digital certificate, and signing and distributing such certificates requires significant network bandwidth. Moreover, each time a message recipient receives a message, the recipient needs to confirm that the accompanying certificate is valid, and this may require additional computational work and network bandwidth.

The use of certificates is further complicated by the need to ensure that a dishonest CA cannot easily compromise the system. Therefore, the CA may be distributed, with different tasks implemented on different CA components, so that if any component is dishonest it cannot, for example, trace a vehicle without collusion with other components.

DISCLOSURE OF INVENTION

Technical Problem

Accordingly, embodiments of the present invention are directed to a display device and controlling method thereof that substantially obviate one or more problems due to limitations and disadvantages of the related art.

Some embodiments of the present invention use ID-based cryptography to meet the security needs of vehicular and other systems. In conventional ID-based cryptography, a user's public key is the user's ID, e.g. the name or email address. A trusted entity called Private Key Generator (PKG) issues a corresponding private key to the user. The private key is based on the user's ID and the PKG's secret parameters.

When a user signs a message with the private key, the message recipient uses the sending user's ID as the public key. The recipient can verify the message using the public key and the PKG's public parameter.

In some embodiments of the present invention, a vehicle generates its own pseudonyms, and uses a pseudonym as an ID. A PKG generates the corresponding private key for the vehicle.

To thwart a dishonest PKG, the PKG may be distributed. In particular, in some embodiments, different PKGs are used to receive different components of a pseudonym and generate respective components of the private key. Further, a signature can be generated by different parts of a system, e.g. different vehicles in a vehicle platoon. Some embodiments make it harder for a vehicle to misbehave.

The invention is not limited to the features described above except as defined by the appended claims.

Technical tasks obtainable from the present invention are non-limited the above mentioned technical tasks. And, other unmentioned technical tasks can be clearly understood from the following description by those having ordinary skill in the technical field to which the present invention pertains.

Solution to Problem

In the present specification, various embodiments for a vehicle system according to the present invention and a method of controlling therefor are disclosed.

To achieve these objects and other advantages and in accordance with the purpose of the invention, as embodied and broadly described herein, a display device according to one embodiment of the present invention may A method comprise generating, by a first computer entity, a private key for a public key cryptographic scheme, said generating comprising: generating, by the first computer system, a pseudonym value hiding an identity of the first computer entity, the pseudonym value corresponding to a public key for the public key cryptographic scheme; obtaining by the first computer entity, from the pseudonym value, a plurality of partial pseudonym values, wherein the pseudonym value is not computable from any one of the partial pseudonym values; sending, by the first computer entity, each partial pseudonym value to a respective private key generator (PKG), at least two partial pseudonym values being sent to respective different PKGs; and for each partial pseudonym value, receiving by the first computer entity, from the respective PKG, a respective private key component.

In another aspect of the present invention, as embodied and broadly described herein, a first computer entity configured to perform a method comprising generating a private key for a public key cryptographic scheme according to another embodiment of the present invention may comprise generating, by the first computer system, a pseudonym value hiding an identity of the first computer entity, the pseudonym value corresponding to a public key for the public key cryptographic scheme; obtaining by the first computer entity, from the pseudonym value, a plurality of partial pseudonym values, wherein the pseudonym value is not computable from any one of the partial pseudonym values; sending, by the first computer entity, each partial pseudonym value to a respective private key generator (PKG), at least two partial pseudonym values being sent to respective different PKGs; for each partial pseudonym value, receiving by the first computer entity, from the respective PKG, a respective private key component.

Advantageous Effects of Invention

Effects of the present invention are described in the following.

First of all, a method generating a private key for a public key cryptographic scheme according to an embodiment of the present invention can issue a corresponding private key to the user, so that it cam improve security of vehicular and other systems.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings:

FIG. 10 is a table that indicates BONEH-FRANKLIN IDENTITY—BASED ENCRYPTION SCHEME.

BEST MODE FOR CARRYING OUT THE INVENTION

Figure 1:
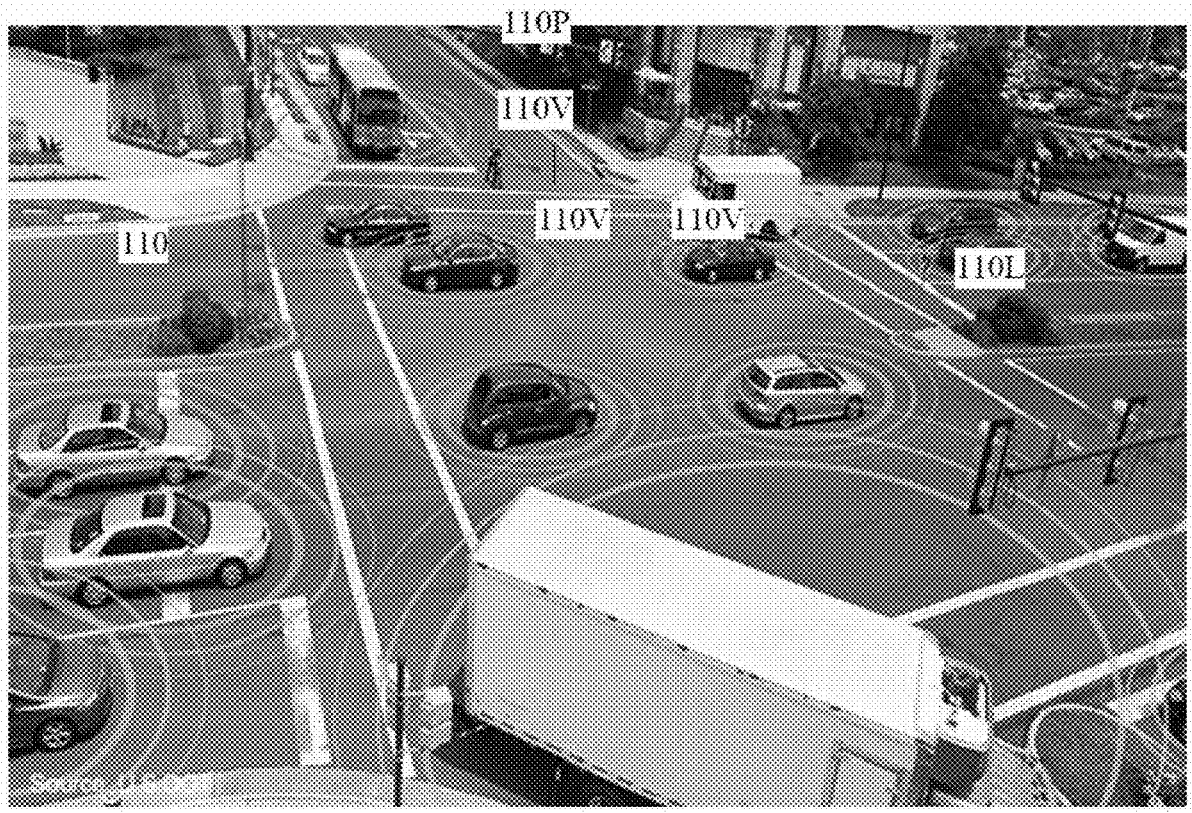
FIG. 1 illustrates an environment in which systems and methods of the present disclosure can operate.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

FIG. 1 illustrates an environment in which systems and methods of the present disclosure can operate. FIG. 1 shows a busy intersection with various entities or objects, such as vehicles 110V (cars, trucks, and possibly other types, e.g. trains or bicycles), pedestrians 110P, roadside equipment 110L (e.g., traffic lights, along with hub or gateway for short and longer-range communications). Each of objects or entities 110 (110V, 110L, 110P, etc.) carries or incorporates equipment, such as smart phones, automotive information devices, or other computing devices. Using their respective computing devices, the objects or entities 110 communicate (e.g., wirelessly) to share information, coordinate, etc. Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
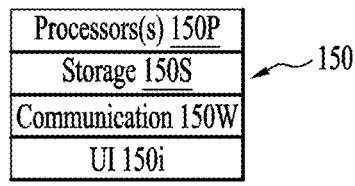
FIG. 2 is a block diagram of a computing device for use in the example environment.

FIG. 2 illustrates an embodiment of a computing device 150 used by the vehicles or other entities and objects, e.g., for communicating, coordinating, etc. in the environment of FIG. 1. As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein.

Computing device or equipment 150 may include user interface 150i, e.g. such as present in a smart phone, an automotive information device, or of some other type device, for use by pedestrians, vehicle drivers, passengers, traffic managers, and possibly other people.

Figure 3A:
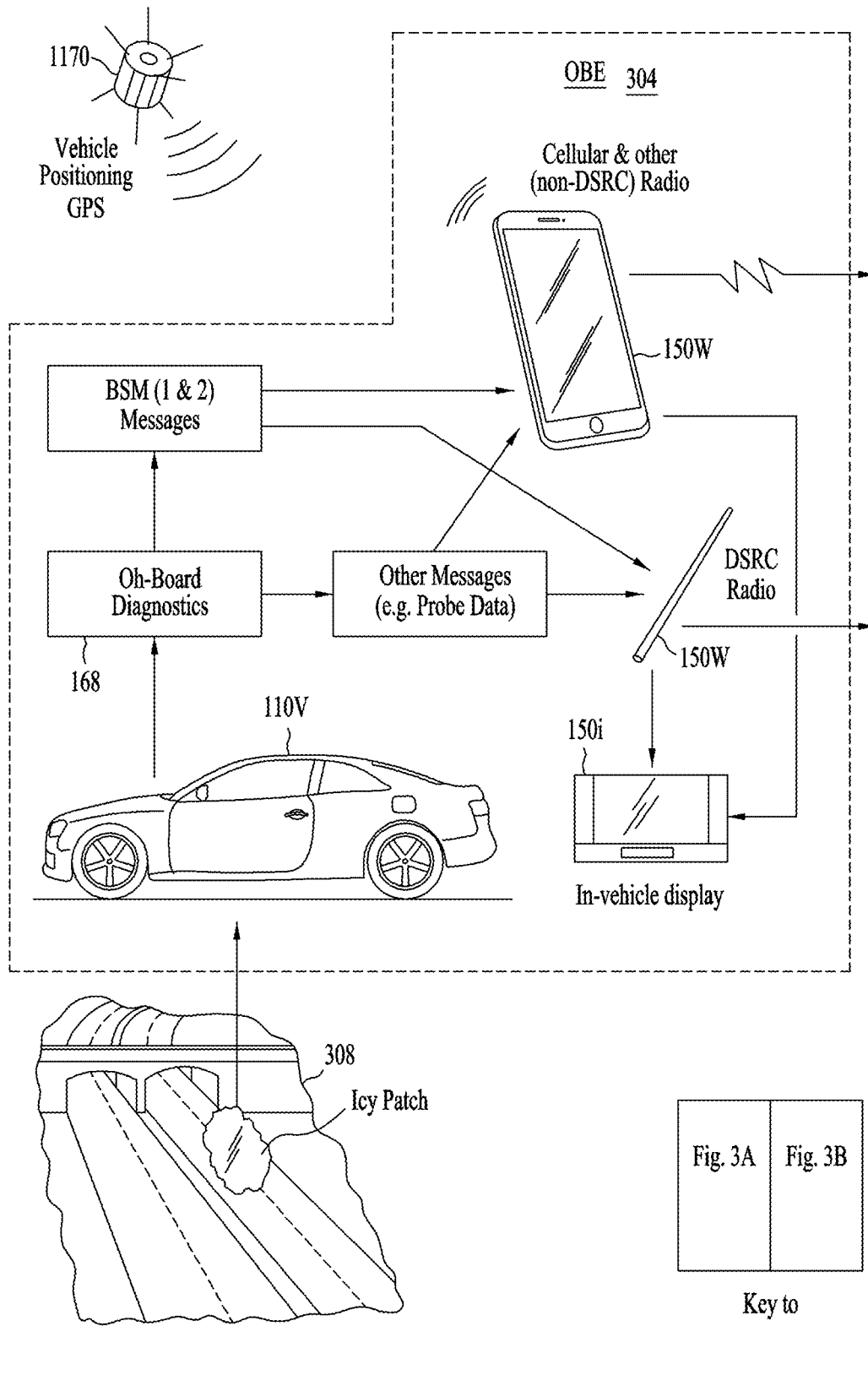
FIG. 3 consisting of FIGS. 3A and 3B, is a representation of communications among vehicles and other equipment in the example environment.
FIG. 3C illustrates possible privacy threat for a vehicle moving past various sites.
Figure 3B:
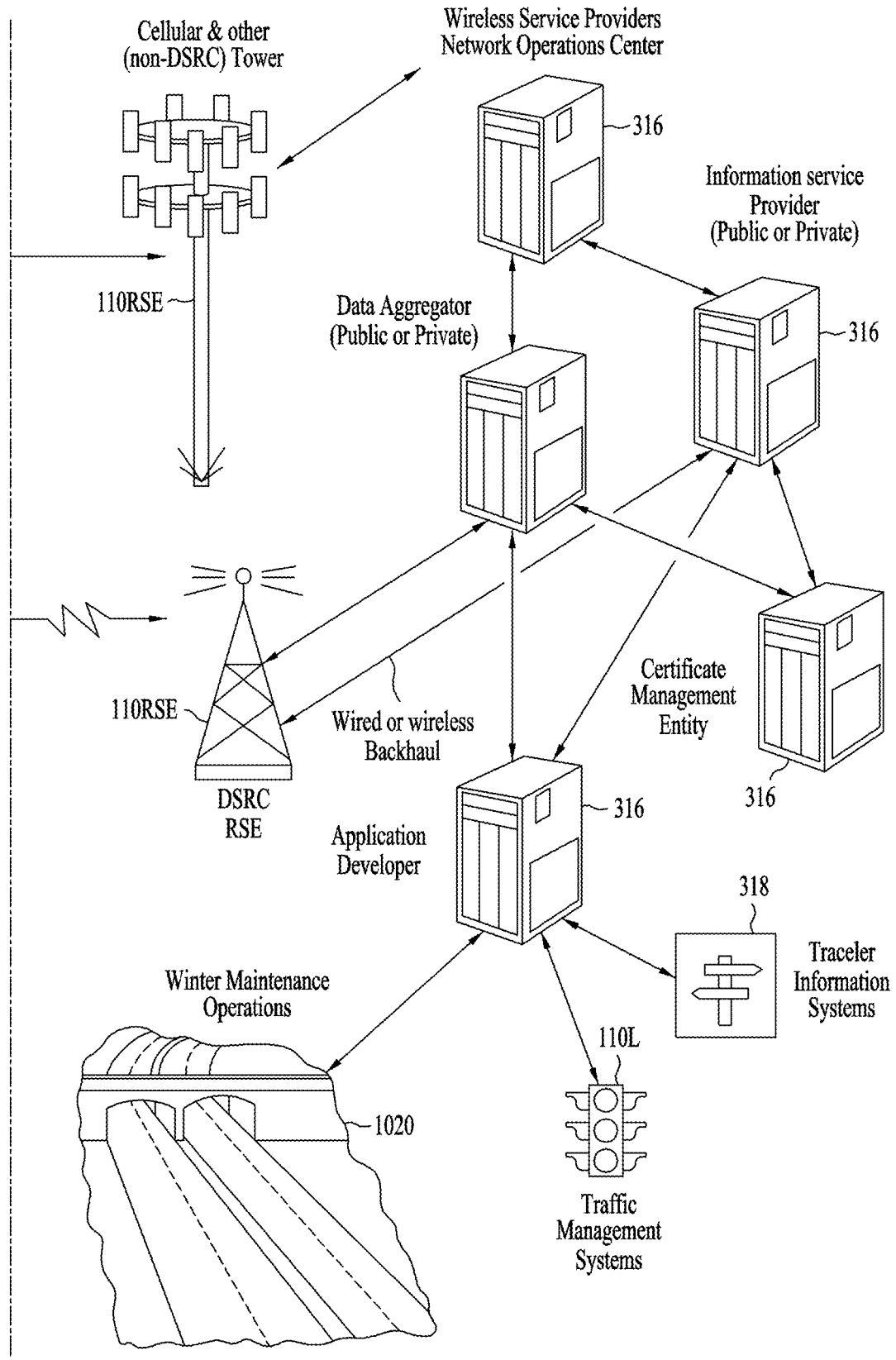
Figure 3C:
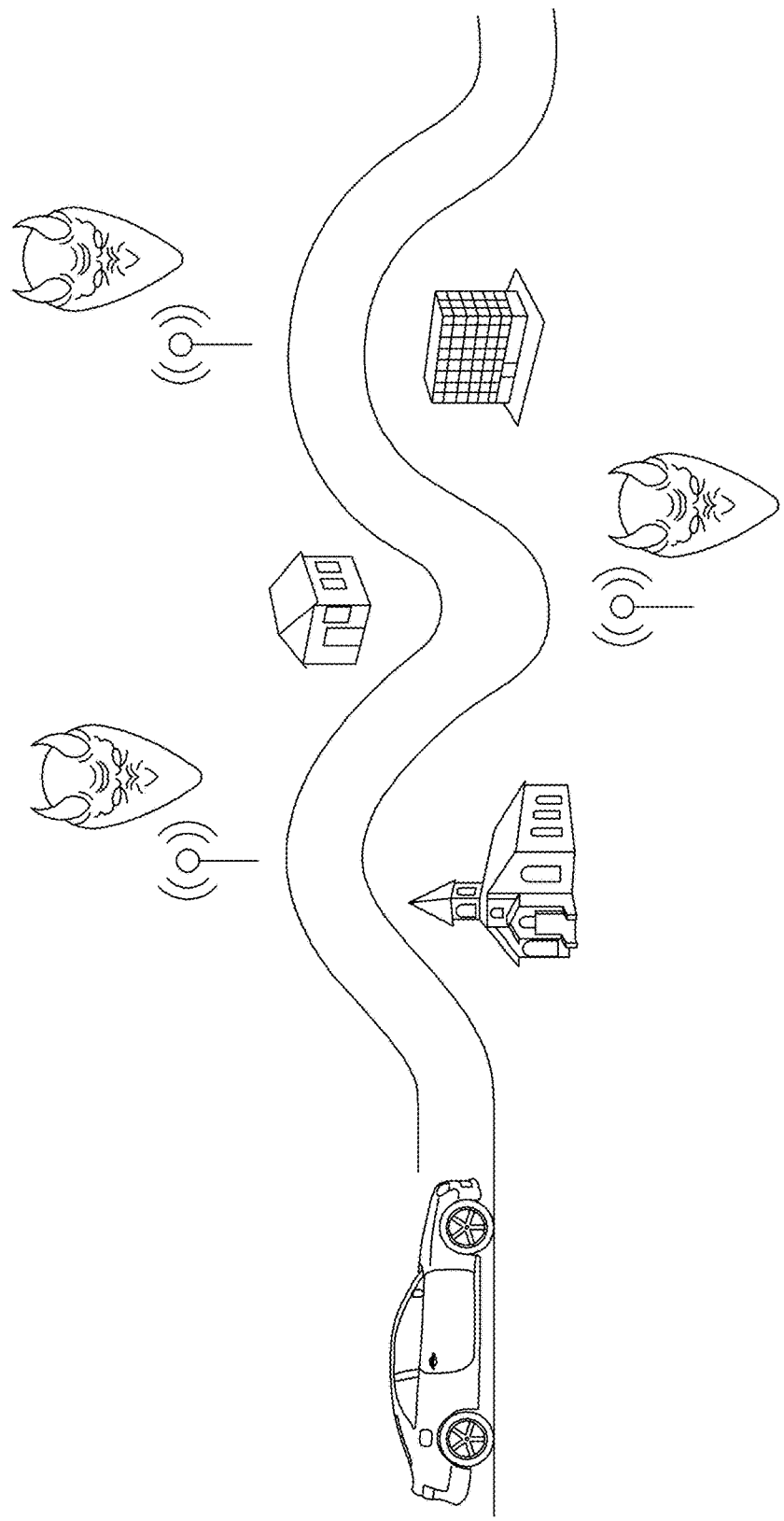

FIG. 3 illustrates examples of communication schemes for entities or objects 110 or their computing devices 150 ("object 110", "user 110", and "equipment 150" may be used interchangeably herein when no confusion arises), interacting via V2X or connected vehicle technology. At a scene 308, a vehicle 110V encounters an icy road patch.

The vehicle 110V includes On Board Equipment (OBE) 304 with one or more sensors—such as accelerometers, brake monitors, object detectors, LIDAR, etc.—for sensing conditions within and around vehicles 110V, such as sudden breaking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," IEEE Vehicular Networking Conference, 2013, pp. 1-8, and CAMP, "Security credential management system proof-of-concept implementation—EE requirements and specifications supporting SCMS software release 1.1," Vehicle Safety Communications Consortium, Tech. Rep., May 2016 (available: https:/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other road side equipment (RSE) 110RSE directly, i.e., without intermediate network switches. The RSE may act like a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in a scene 1020, and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate, or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 in can be implemented or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process the same, and communicate information or instructions throughout the environment in order to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect from such misbehavior, the communications should be authenticated, for example, using public-key cryptography. Each vehicle 110V or other equipment is provided with a private key (e.g., for signing a message) and a public key (e.g., for signature verification). The public key is distributed to the public, but the private key is kept secret. A detailed discussion of public key cryptographic schemes is presented below.

Threat Model

As noted above, V2X communication yields many benefits for individual driver safety and the overall traffic management. However, it is possible for misbehaving vehicles to abuse the system by sending forged messages which selfishly benefit individual drivers. For instance, a driver may broadcast that there is an accident in a road segment thus forcing navigation algorithms to re-route to different routes giving the driver a free path. A misbehaving vehicle can launch a variety of attacks affecting various security features in the V2V (e.g. forward collision warning, blind spot/lane change, do not pass, etc.) and V2I (e.g. smart roadside assistance, transit/pedestrian warning, etc.) scenarios. Such malicious use of the V2X services motivates the need for authenticated communication, possibly with side channel attack protection. This is achieved by identifying and authenticating communicating vehicle. For example, the V2X service can use the Vehicle Identification Number (VIN) to identify each vehicle, and use asymmetric cryptography to authenticate all messages from that vehicle.

However, most identified and authenticated communication can lead to various privacy threats. A malicious attacker may compromise an infrastructure road-side unit 110RSE to track driver behavior and learn their location and driving patterns.

The scope of the threat depends on which aspect of the V2X ecosystem is compromised by the adversary. The V2X ecosystem essentially consists of an on-board unit (OBU or OBE) 304 residing in the vehicle, a road-side unit (RSU) 110RSE which directly communicates with the vehicle, and cloud services (provided by systems 316) which communicate with the RSUs (as is common) or communicate with the OBUs 304 directly (uncommon). Some vehicle identifiers inherently contain information about the owner. For instance, the Medium Access Control (MAC) address of the vehicle's communication equipment 150W contains semantic information about the manufacturer of the equipment's wireless chip, and the IP (Internet Protocol) address reveals the approximate geographic location of the user. We call such identifiers as "informative identifiers" If the identifier has no semantic information, we call it "anonymous identifier".

The attacker poses different threats. The attacker can steal private information if they have access to the informative identifiers. This attack can happen at any stage of the V2X ecosystem. The attacker can track location in real-time of different vehicles. This can happen on a large scale where the attacker compromises multiple RSUs 110RSE or some cloud services. For instance, malicious entities can monitor the location of police vehicles by large-scale location tracking. It can also happen on a local scale where the attacker only has compromised one or two RSUs surrounding a location. For instance, the attacker can learn when the victim (driver) has left the victim's house. Finally, the attacker can profile long-term behavior of its victims by tracking their long-term driving patterns. For instance, the attacker may learn about people's religious or political affiliation by tracking the people's visits to the church or political gatherings. See, for example, FIG. 3C.

Pseudonym-Based Certification

The requirement of accountability and privacy-preservation can be achieved by using frequently changing pseudonyms. See J. Petit, F. Schaub, M. Feiri, and F. Kargl, "Pseudonym schemes in vehicular networks: A survey," IEEE communications surveys & tutorials, vol. 17, no. 1, pages 228-255 (2015), incorporated herein by reference. Pseudonymous certification schemes typically have three stages. First is authenticated pseudonym issuance. A vehicle's on-board unit (OBU) 304 will request a new set of pseudonyms from a certification authority (CA) executed by a system or systems 316. The CA will verify the authenticity of the requesting OBU and distribute a set of new pseudonyms. Second, the OBU will change the pseudonym based on an agreed-upon pattern in order to maintain the vehicle's privacy. The pseudonyms must be changed often enough to avoid linking privacy-sensitive location traces of the same vehicle. Third, if the vehicle is known to abuse V2X services or is compromised by an attacker, the vehicle's pseudonyms must be added to a Certificate Revocation List (CRL) and no longer acknowledged by V2X service providers.

There are many proposed systems which address parts of the pseudonym life-cycle; see J. Petit et al. cited above. Some proposed systems address all aspects of the pseudonym life-cycle; see W. Whyte, A. Weimerskirch, V. Kumar, and T. Hehn, "A security credential management system for v2v communications," in Vehicular Networking Conference (VNC), 2013 IEEE. IEEE (2013) pages 1-8, incorporated herein by reference.

In order to address possible misbehavior of the CAs, some embodiments of the invention use Identity Based Cryptography (IBC). The CAs are replaced by Private Key Generators (PKGs). In particular, in some embodiments, distributed PKGs can be used, where multiple PKGs cooperate to issue a private key to a vehicle.

Identity Based Cryptography

First, we explain general IBC concepts on the example of encryption. Then IBC signature schemes will be discussed.

For encryption, consider two communicating parties—Alice and Bob. In identity based cryptography (IBC) there is a trusted third entity known as the Private Key Generator (PKG); see H. Kupwade Patil and S. A. Szygenda, "Security for wireless sensor networks using identity based cryptography", CRC Press, 2012, incorporated herein by reference. In order for Alice to send an encrypted message to Bob, she uses Bob's name (i.e. "Bob") as the public key to encrypt the message. In order to decrypt the message, Bob contacts the PKG, verifies his own identity as "Bob" to the PKG, receives a private key corresponding to Bob's ID ("Bob"), and decrypts the message. The four steps of traditional IBC—Setup, Extract, Encrypt, and Decrypt—are described in detail in D. Boneh and M. Franklin, "Identity-based encryption from the Weil pairing," SIAM J. Comput., vol. 32, no. 3, pp. 586-615 (2003), which also appeared in CRYPTO '01, incorporated herein by reference; see also the H. Kupwade Patil reference cited above.

FIG. 10 is table 1 that indicates BONEH-FRANKLIN IDENTITY—BASED ENCRYPTION SCHEME. Referring to FIG. 10, below provides an example of this scheme. In Table 1, "$E/F_p$" denotes an elliptic curve group over the field $F_p$ of a prime order p. The group $E/F_p$ has a prime order q. The group's element P is a group generator.

Identity Based Cryptography also provides Identity Based Signature schemes. In such a scheme, Bob obtains a private key corresponding to Bob's ID "Bob" from the PKG. Bob uses the private key to digitally sign a message, and sends the message and the signature to Alice. Alice uses Bob's ID "Bob" as the public key to verify the signature.

As is well known, in some public key cryptosystems, a signature scheme is obtained from an encryption scheme as follows. The digital signature on a message is generated by executing a decryption algorithm on the message, as if the message were a cyphertext. The signer sends both the message and the signature to the recipient. The recipient verifies the signature by: (1) performing the encryption algorithm on the signature, to recover the message from the signature; and (2) comparing the recovered message with the message separately received from the signers. The invention is not limited to such cryptosystems however.

The encryption scheme of Table 1 can be turned into a signature scheme as follows. We will call this signature scheme "BFS" (Boneh-Franklin based Signature):

BFS Signature Scheme Description

The Setup and Extract steps are as in Table 1. To sign a message M, the signer:

1. Requests the verifier to generate and provide a value U=rP where r is in $Z_q$.

2. Sets the signature Sig to: Sig=M⊕H(ê($d_{ID}$, U))

3. Sends the message M and the signature Sig to the verifier.

To verify the signature, the verifier computes:

V=H(ê($Q_{ID}$,$P_{pub}$)$^r$), and accepts the signature if, and only if,

Sig⊕V=M

End of BFS Signature Scheme Description

Figure 4A:
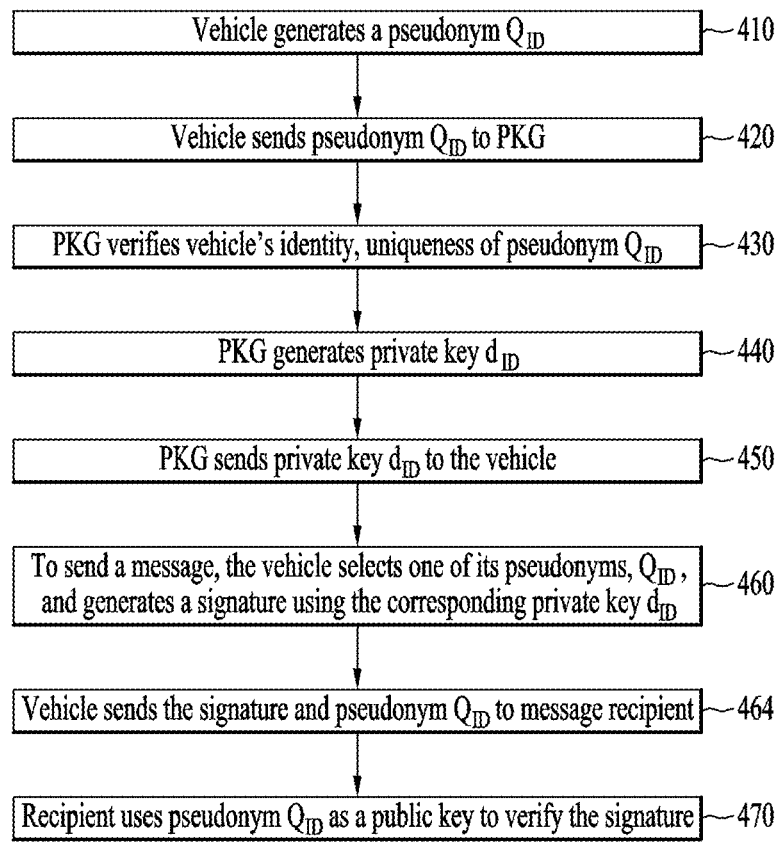
FIG. 4A is a flowchart illustrating an authentication process according to some embodiments of the present disclosure.
Figure 4B:
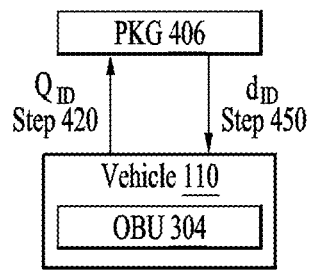
FIG. 4B is a block diagram illustrating communications between different computer entities in the process of FIG. 4A.

FIGS. 4A, 4B illustrate using IBC in a pseudonymous V2X scheme. BFS or some other scheme can be used. A PKG 406 (FIG. 4B) is implemented by a computer system or systems 316. At step 410 (FIG. 4A), a vehicle 110 (i.e. vehicle's OBU 304) generates a pseudonym $Q_{ID}$. In some embodiments, $Q_{ID}$ is generated as a random digital value. (See the Extract step in Table 1 for example). At step 420, the vehicle sends the pseudonym $Q_{ID}$ to the PKG in a request to provide the corresponding private key $d_{ID}$. This request can be authenticated, e.g. by means of the vehicle's enrollment certificate described in the above-cited Whyte et. al. reference in connection with SCMS. The enrollment certificate certifies to the PKG that the vehicle is authorized to use V2X services.

At step 430, the PKG verifies the true identity of the vehicle (that the vehicle is authorized to use V2X services). The PKG also ensures that the pseudoidentity $Q_{ID}$ is not already claimed by another vehicle. Once the checks are completed, the PKG generates the private key $d_{ID}$ (step 440). At step 450, the PKG sends the private key $d_{ID}$ securely (e.g. in encrypted form) to the vehicle.

The vehicle may have multiple pseudonyms $Q_{ID}$. To send a message to another entity (e.g. another vehicle 110V or road side unit 110RSE), the vehicle selects one of its pseudonyms $Q_{ID}$, and signs the message with the corresponding private key $d_{ID}$; see step 460. At step 464, the vehicle sends the signature and the pseudonym $Q_{ID}$ to the recipient. (The vehicle also sends the message unless the message is recoverable in the signature verification process.) The recipient can verify the signature at step 470 using the pseudonym $Q_{ID}$ as the public key.

As noted above, some embodiments use the BFS scheme. Other embodiments use the Hess signature scheme described below. Other signature schemes can also be used.

If PKG 406 is not distributed, the following security problems may occur. First, the PKG knows the true identity and the corresponding pseudoidentity ($Q_{ID}$) of the vehicle 110. The PKG can then track the vehicle and compromise the privacy. Second, the PKG knows the private key $d_{ID}$ of the vehicle. This allows the PKG to masquerade as the vehicle and compromise the authenticity.

To address these issues, some embodiments use a distributed PKG for IBC. The PKG is split into multiple entities (also called PKGs), marked as 406.1, ... 406.n in FIGS. 5A, 5B, where n is an integer greater than one. Each entity 406.i (i=1, ..., n) can be implemented by a system or systems 316. Different PKGs 406.i can be implemented on respective different entities 316 if needed to impede them from colluding with each other, but this is not necessary in other embodiments.

In some embodiments, for each pseudonym $Q_{ID}$, each PKG 406.i will receive a pseudonym component ("partial pseudonym") $Q_{IDi}$, and will generate a respective private key component $d_{IDi}$. None of the PKGs 406.i will know the pseudonym $Q_{ID}$ or the private key $d_{ID}$.

Figure 5A:
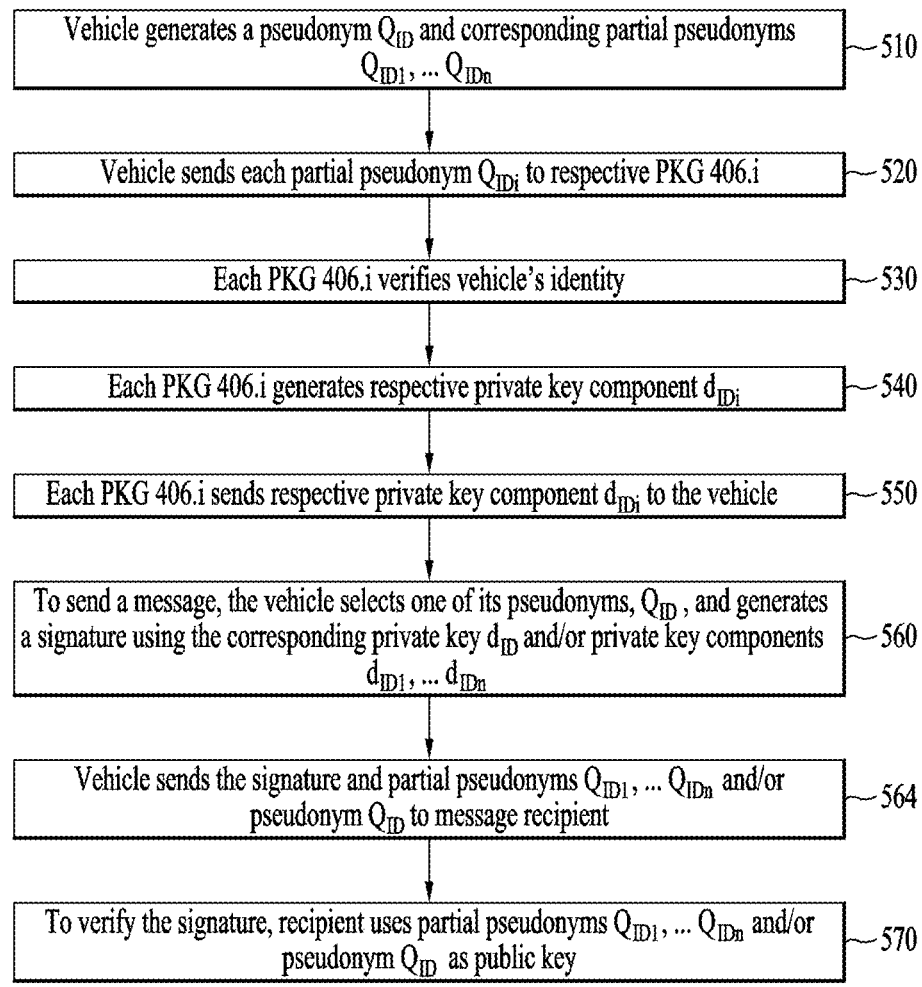
FIG. 5A is a flowchart illustrating an authentication process according to some embodiments of the present disclosure.
Figure 5B:
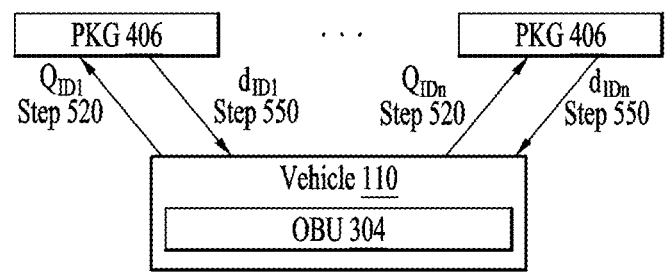
FIG. 5B is a block diagram illustrating communications between different computer entities in the process of FIG. 5A.

Some embodiments are illustrated in FIG. 5A. At step 510, the vehicle generates a pseudonym $Q_{ID}$. The vehicle also generates corresponding partial pseudonyms $Q_{ID1}, \ldots, Q_{IDn}$. For example, the vehicle may generate partial pseudonyms as random values; then generate the pseudonym $Q_{ID}$ by combining the partial pseudonyms $Q_{IDi}$.

At step 520, the vehicle sends each partial pseudonym $Q_{IDi}$ to the respective PKG 406.i but not to any other PKG. Unless the PKGs 406.i collude, neither PKG learns the pseudonym $Q_{ID}$.

At step 530, each PKG 406.i verifies the true identity of the vehicle (that the vehicle is authorized to use V2X services). This can be done as at step 430 in FIG. 4A. Once this check is completed, the PKG 406.i generates a private key component $d_{IDi}$ corresponding to partial pseudonym $Q_{IDi}$ (step 540). At step 550, each PKG 406.i sends its private key component $d_{IDi}$ to the vehicle in a secure manner (e.g. in encrypted form). Depending on a specific embodiment, the vehicle may or may not generate the private key $d_{ID}$ from private key components $d_{IDi}$.

The vehicle may have multiple pseudonyms $Q_{ID}$; each pseudonym corresponds to a set of partial pseudonyms $Q_{IDi}$ and a set of private key components $d_{IDi}$. To send a message to another entity (e.g. another vehicle or RSU), the vehicle selects one of its pseudonyms $Q_{ID}$, and signs the message using the corresponding private key components $d_{IDi}$; see step 560. The vehicle then sends the signature and the pseudonym $Q_{ID}$ to the recipient step 564). Alternatively or in addition, the vehicle sends the partial pseudonyms $Q_{IDi}$ to the recipient at step 564. (The vehicle also sends the message itself unless the message is recoverable in the signature verification process.) The recipient can verify the signature at step 570 using, as the public key, the partial pseudonyms $Q_{IDi}$ and/or the pseudonym $Q_{IDi}$.

Figure 6:
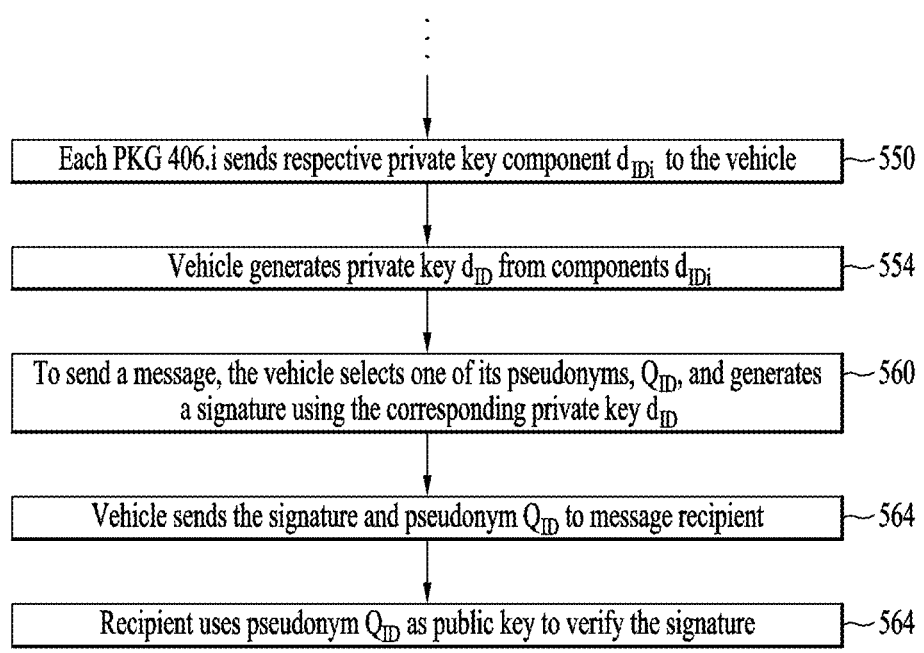
FIGS. 6, 7, and 8 are flowcharts of authentication processes according to some embodiments of the present disclosure.

FIG. 6 illustrates one variation in which the signature generation and verification are as in a case of a non-distributed PKG because the signature and verification do not use partial pseudonyms or private key components. In this variation, steps 510 through 550 are as in FIG. 5A. At step 554, the vehicle generates private key $d_{ID}$ from private key components $d_{IDi}$.

To sign and verify messages, the pseudonyms $Q_{ID}$ and the corresponding private keys $d_{ID}$ are used as in FIG. 4A; steps 560 through 570 of FIG. 6 are as respective steps 460 through 470 in FIG. 4A.

Figure 7:
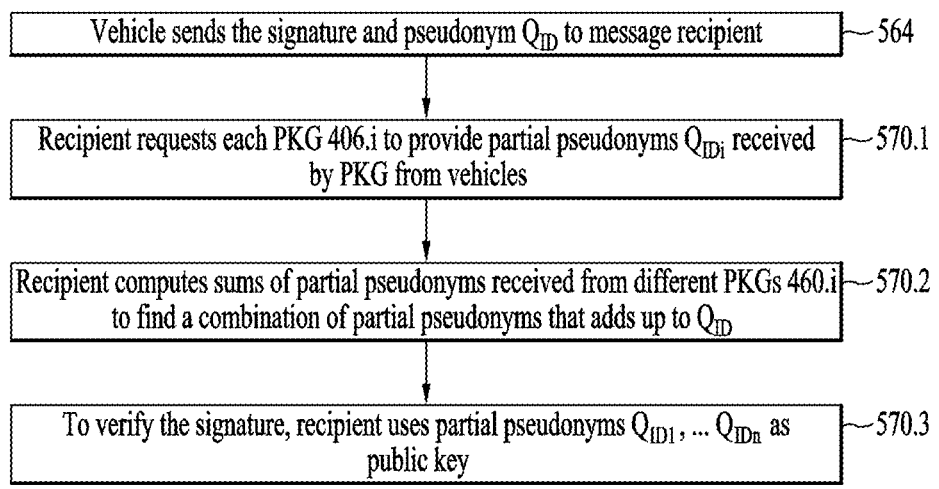

FIG. 7 shows an example when the signature verification process (step 570) uses partial pseudonyms $Q_{IDi}$, but the partial pseudonyms are not provided to the recipient. The partial pseudonyms are obtained by the recipient from the PKG. Specifically, this example may start with steps 410 through 450 as in FIG. 4A, or steps 510 through 550 as in FIG. 5A. Step 564 is as in FIG. 6: the vehicle sends the pseudonym $Q_{ID}$ but not the partial pseudonyms to the recipient.

At step 570.1, the recipient queries each PKG 460.i for a list of partial pseudonyms $Q_{IDi}$ (with the same index "i") received by the PKG at step 520, possibly from different vehicles 110. At step 570.2, the recipient searches through each combination $\{Q_{IDi}, \ldots Q_{IDn}\}$ of the partial pseudonyms received from the PKGs. Each combination contains one partial pseudonym from each PKG 460.i. For each combination, the recipient determines whether the combination corresponds to the pseudonym $Q_{ID}$ received at step 564. For example, if the partial pseudonyms satisfy the equation (1) discussed below, the recipient determines if the partial pseudonyms for the combination add up to the pseudonym $Q_{ID}$.

If a combination is found whose partial pseudonyms correspond to the pseudonym $Q_{ID}$, then at step 570.3 the recipient verifies the signature using the partial pseudonyms of that particular combination.

In some embodiments, the signature verification is performed by RSU 110RSE. For example, the verification can be performed by the RSU that is in direct communication with the vehicle sending the message, even if the RSU is not the intended message recipient. In some embodiments, the intended recipient is another vehicle, and the message verification is performed by an RSU that is in direct communication with the intended recipient. In either case, the RSU forwards the message to the recipient if the verification successes; otherwise the RSU blocks the message or sends the message with an indication that the verification failed. The RSU may take some other action in case of failure; for example, the RSU may inform an appropriate authority to allow that authority to determine if the pseudonym should be revoked.

While in the examples above and below the message sender is a vehicle, the message sender can be some other entity 110.

In some distributed-PKG embodiments, the pseudonym $Q_{ID}$ is constructed or made up from partial pseudonyms $Q_{IDi}$ as follows:

$$Q_{ID}=Q_{ID1}+Q_{ID2}+\ldots+Q_{IDn} \tag{1}$$

In some embodiments, the partial pseudonyms $Q_{IDi}$ are randomly generated.

In some embodiments, the private key $d_{ID}$ is generated by the vehicle, at step 554 for example, from the various private key components $d_{IDi}$ as follows:

$$d_{ID}=d_{ID1}+d_{ID2}+\ldots+d_{IDn} \tag{2}$$

Example Signature Schemes

While various IDS (Identity-Based Signature) schemes can be used, some examples will now be provided based on bilinear pairings in elliptic curve groups.

With respect to BFS, a distributed PKG scheme can be constructed as follows.

The Setup stage is similar to BFS. The group $E/F_p$ is the same for all the PKGs 406.i. Each PKG 406.i generates its master secret $s_i$ and the public parameters $P_i$ (which is a generator of $E/F_p$), and sets $P_{pubi}=s_iP_i$.

Given the vehicle ID ID, the vehicle generates $Q_{ID}$ as in Table 1 (Extract), and randomly generates all but one of the $Q_{IDi}$ parameters to meet the equation (1).

The key extraction is as in BFS: at step 540, each PKG 406.i generates $d_{IDi}=s_iQ_{IDi}$.

Examining the BFS signature scheme described above, the same signature and verification algorithms will work for the distributed PKG if P, $P_{pub}$, and other parameters are defined so that, for all r in $Z_q$.

$$H(\hat{e}(d_{ID}, rP)) = H(\hat{e}(Q_{ID}, P_{pub})^r) \quad (3)$$

The equation (3) holds true, for example, if the following 3 conditions are met:
1. All $s_i$ are equal to each other;
2. $P = P_1 + \ldots + P_n$
3. $P_{pub} = P_{pub1} + \ldots + P_{pubn}$ The equation (3) then holds true due to bilinearity of ê.

Another signature scheme is similar to the scheme immediately above, but the $s_i$ parameters can be different from each other. However, the $P_{pub}$ and $P_i$ parameters are chosen so that:

$P_i = s_i^{-1} P_{pub}$ for all i, where $s_i^{-1}$ is the inverse of $s_i$.

For example, in some embodiments, one of the PKGs 406.i can generate and publish $P_{pub}$, and every PKG 406.i sets its $P_i$ to $s_i^{-1} P_{pub}$.

To sign a message M, the signer:
1. Requests the verifier to generate and provide a value $U_i = \gamma P_i$ for all i=1, ..., n, where γ is in $Z_q$.
2. Sets the signature Sig to:

$$Sig = M \oplus H\left(\prod_{i=1}^{n} \hat{e}(d_{IDi}, U_i)\right)$$

3. Sends the message M and the signature Sig to the verifier.

To verify the signature, the verifier computes:

$$V = H(\hat{e}(Q_{ID}, P_{pub})^\gamma)$$

and accepts the signature if, and only if, $$Sig \oplus V = M$$

This scheme is consistent, as can be seen from bilinearity of ê.

Some embodiments use the Hess signature described in F. Hess, "Efficient identity based signature schemes based on pairings," in Selected Areas in Cryptography: 9th Annual International Workshop, SAC 2002 St. John's, Newfoundland, Canada, Aug. 15-16, 2002 Revised Papers, K. Nyberg and H. Heys, Eds. Berlin, Heidelberg: Springer Berlin Heidelberg, 2003, pages 310-324, incorporated herein by reference. This signature scheme is as follows.

Let (G, +) and (V, ·) denote cyclic groups of prime order 1, let P∈G be a generator of G and let e: G×G→V be a pairing which satisfies the following conditions:
1. Bilinear: $e(x_1+x_2, y) = e(x_1, y)e(x_2, y)$ and $e(x, y_1+y_2) = e(x, y_1)e(x, y_2)$.
2. Non-degenerate: There exists x∈G and y∈G such that $e(x, y) \neq 1$.

We also assume that e(x, y) can be easily computed while, for any given random b∈G and c∈V, it should be infeasible to compute x∈G such that e(x, b)=c. We remark that the pairing e is not required to be symmetric or antisymmetric. Furthermore we define the hash functions h: $\{0,1\}^* \times V \to (Z/lZ)^X$, H: $\{0,1\}^* \to G^*$, where $G^* := G/\{0\}$. We also abbreviate $V^* := V/\{1\}$.

The identity based signature scheme can include the steps of Setup, Extract (private key generation), Sign and Verify. There are three parties in the system, the trust authority (or TA, similar to a non-distributed PKG), the signer (e.g. vehicle 110), and the verifier (e.g. recipient or RSU).

Setup: A Trusted Authority (like a non-distributed PKG) picks a random integer $t \in (Z/lZ)^X$, computes $Q_{TA} = tP$ and publishes $Q_{TA}$ while t is kept secret.

Extract (private key generation): This process is performed by the TA when a signer requests the secret key corresponding to their identity. Suppose the signer's identity is given by the string ID. The secret key of the identity is then given by $S_{ID} = tH(ID)$, which is computed by the TA and given to the signer. The extraction step is typically done once for every identity and uses the same setup data for many different identities.

Sign: To sign a message m the signer chooses an arbitrary $P_0 \in G^*$, picks a random integer $k \in (Z/lZ)^X$ and computes:

$$r = e(P_0, P)^k.$$

$$v = h(m, r).$$

$$u = v S_{ID} + k P_0.$$

The signature is then the pair $(u, v) \in (G, (Z/lZ)^X)$.

Verify: On receiving a message m and signature (u, v) the verifier computes:

$$r = e(u, P) \cdot e(H(ID), -Q_{TA})^v.$$

Accept the signature if and only if v=h(m, r).

Signcryption

Figure 9:
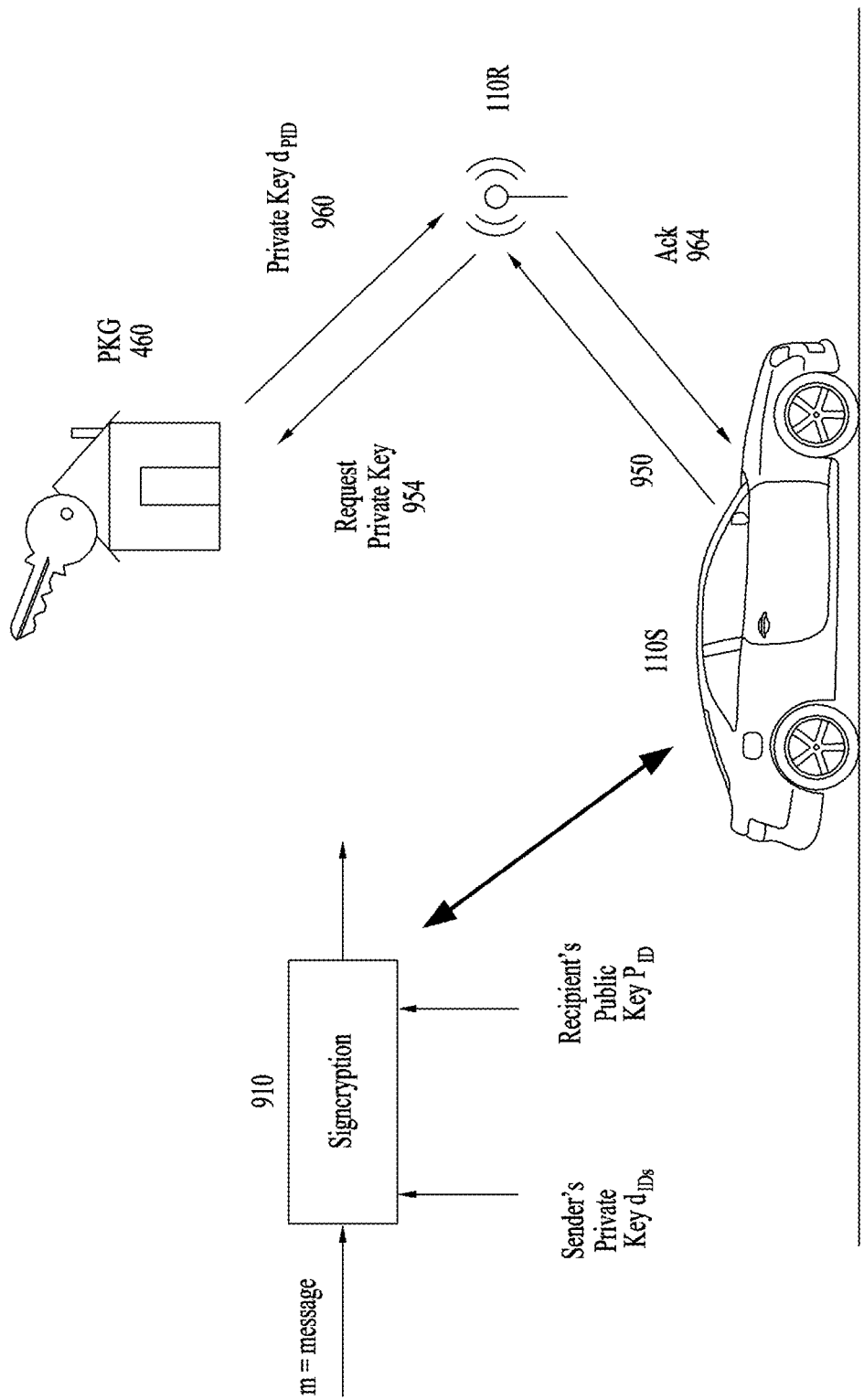
FIG. 9 illustrates a signcryption scheme according to some embodiments of the present invention.

This model can be further extended to signcryption, as shown in FIG. 9 for example. A sender 110S (a vehicle or some other device 110) sends a signed and encrypted message m to a recipient 110R (another vehicle, a roadside unit, or some other device 110). The signcryption apparatus 910 is part of computer system 150 in sender 110S (e.g. implemented by software running on processors 150P, or in some other way). Let us denote the sender's ID as $Q_{IDs}$; the corresponding private key and its components as $d_{IDs}$, $d_{IDsi}$ (the private key and its components can be generated by any suitable method described above, or by any other suitable method); and the recipient's ID as $Q_{IDr}$. The signcryption device 910 receives: (a) the message m, (b) the sender's private key $d_{ID-s}$ or its components $d_{IDsi}$ (as needed depending on the scheme used by apparatus 910), and (c) the recipient's public key $Q_{IDr}$. The output of apparatus 910 is provided to the recipient (at step 950 in FIG. 9).

In some embodiments, the recipient 110R can decrypt the message only if the recipient is legitimate, e.g. is authorized to use the PKG services at the time of communication with the sender. For that purpose, instead of using the recipient's ID $Q_{IDr}$ in signcryption 910, the sender generates an ephemeral public key $P_{ID}$ (a pseudoidentity) for the recipient, to force the recipient to request the corresponding private key $d_{PID}$ from a PKG 460 (step 954). For example, the ephemeral key $P_{ID}$ can be derived by combining (e.g. concatenating) the recipient's ID $Q_{IDr}$, and/or a timestamp (current time), and/or a Universally Unique Identifier (UUID), which can be a random value for example. The recipient receives the corresponding private key $d_{PID}$ from PKG 460 (at step 960) only if the recipient is legitimate. Optionally, the recipient sends an acknowledgement to the sender at step 964, responding to the signcrypted message.

Threshold Signature Scheme For V2X

In some embodiments, a message from multiple V2X entities is authenticated using a threshold signature scheme. For example, in FIG. 5B, communication from multiple PKGs is authenticated by an (t+1,n)-threshold signature of t+1 PKGs, where t can be any number greater than zero but less than n. In some embodiments, t=n−1.

Also, some number v of vehicles 110V can form a vehicle platoon (v is greater than one), and the platoon's messages are authenticated by a (t+1,v)-threshold signature of t+1 vehicles where t is greater than zero but less than v. In some embodiments, t=v−1.

Figure 8:
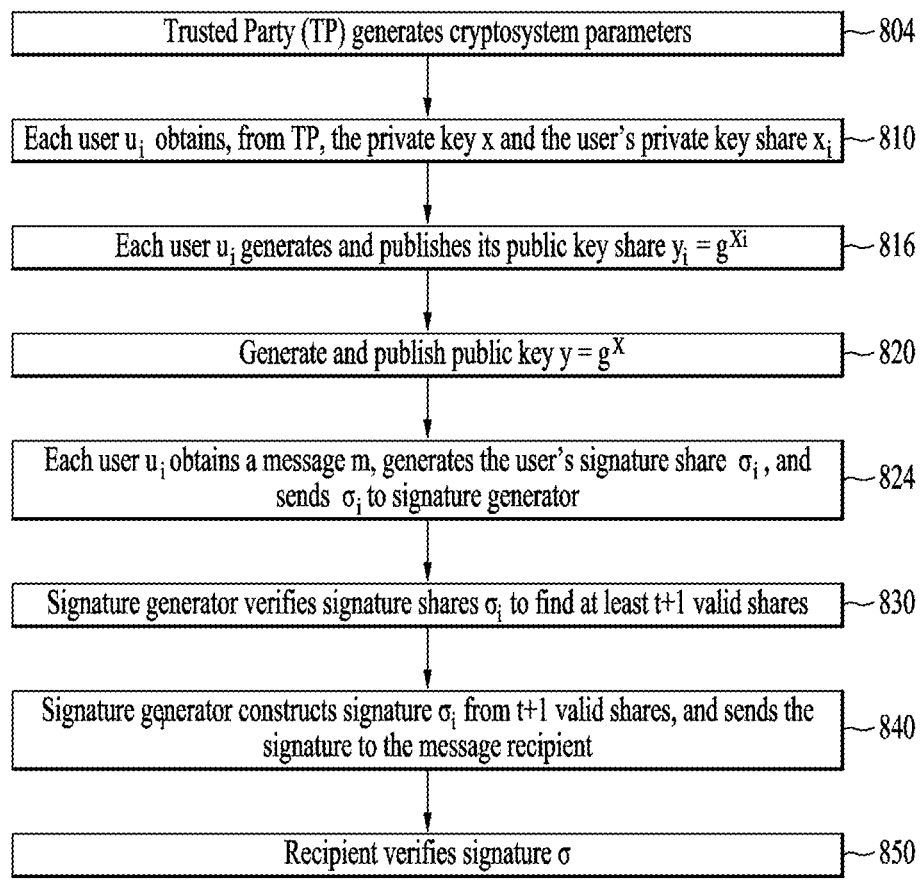

An example threshold signature scheme is an adaptation of a process described in H. Kupwade Patil and S. A. Szygenda, "Security for wireless sensor networks using identity based cryptography", CRC Press, 2012, page 86 (Section 4.3.7), incorporated herein by reference. The signature scheme is illustrated in FIG. 8. This is a (t+1,n) signature scheme, allowing at least (t+1) out of n entities $u_1$, $u_2, \ldots u_n$ to sign a message. The message cannot be signed by less than t+1 entities. Following the H. Kupwade Patil terminology, the entities $u_i$ are called "users" or "servers" below, but they can be any V2X entities.

The signature scheme uses Shamir's secret sharing scheme such that any subset S of t+1 of the entities can sign the message.

Key Generation is performed by a trusted party (TP), like a PKG, at step 804 of FIG. 8. Specifically, the TP generates multiplicative groups $G_1$ and $G_2$ of suitably high order. Let q denote the order of $G_1$, and g denote a generator of $G_1$. At step 804, the TP also generates:

a non-degenerate bilinear pairing ê: $G_1 \times G_1 \rightarrow G_2$, and
a hash function H: $\{0,1\}^* \rightarrow G_1$.

At step 804, the TP uses Shamir's shared secret scheme to generate a private key $x \in Z_q^*$ which is shared among the users $u_i$ such that any subset S of t+1 servers can reconstruct x using Lagrange interpolation: $x = \Sigma_{i \in S} L_i x_i$, where $x_i \in Z_q^*$ is the private key share of server $u_i$, and $y_i = g^{x_i}$ is the public key share of user $u_i$ Specifically, the TP selects a random polynomial f(s) of degree t:

$f(s) = a_0 + a_1 s + \ldots + a_t s^t$, where $a_0, a_1, \ldots a_s$ are randomly generated members of group $G_1$.

Then the TP sets:

$x = a_0$

The TP generates random G1 members s1, . . . , sn and sets:

$x_i = f(s_i), i = 1, \ldots n$.

The TP keeps f, $s_1, \ldots s_n$, x, $x_1, \ldots x_n$ secret.
The public key corresponding to the secret x is $g^x$.
At step 810, for each i, the TP sends $x_i$ and x to user $u_i$. The value $x_i$ is not available to any user other than $u_i$.

At step 816, each user $u_i$ generates and publishes its public key share $y_i = g^{xi}$.

At step 820, some entity (e.g. the TP or one or more of the users $u_i$) generates and publishes the public key $y = g^x$.

Signature Share Generation: At step 824, each user $u_i$ obtains a message $m \in \{0,1\}^*$, and generates the user's signature share $\sigma_i$ as:

$\sigma_i = x_i H(m)$

Each user sends its signature share to a signature generator, e.g. the TP or an RSU.

At step 830, the signature generator checks signature shares $\sigma_i$ by checking that:

$\hat{e}(g, \sigma_i) = \hat{e}(y_i, H(m))$

If $\sigma_i$ passes this test, call $\sigma_i$ an acceptable share.

Signature Reconstruction is performed at step 840 by the signature generator as follows. Suppose at step 830, a set S of (t+1) honest servers $u_i$ is found, and they form (t+1) acceptable signature shares $\sigma_i, i \in S$ At step 840, the signature generator obtains from the TP the Lagrange coefficients $L_i$ for the set S, and generates the signature as:

$$\sigma = \prod_{i \in S} \sigma_i^{L_i}$$

The signature generator sends the signature σ to the message recipient.

At step 850, the recipient verifies the signature with the public key y by checking that:

$\hat{e}(g, \sigma) = \hat{e}(H(m), y)$

The embodiments described above illustrate but do not limit the invention. For example, the techniques described for vehicles can be used by other mobile systems, e.g. pedestrians' smart phones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g. they can be used on computer systems 316.

The invention is not limited to the embodiments described above. Other embodiments and variations are within the scope of the invention, as defined by the appended claims.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A method comprising:
   generating, by a first computer entity, a pseudonym value hiding an identity of the first computer entity, the pseudonym value corresponding to a public key for a public key cryptographic scheme;
   obtaining, by the first computer entity, from the pseudonym value a plurality of partial pseudonym values, wherein the pseudonym value is not computable from any single one of the partial pseudonym values;
   sending, by the first computer entity, each of the plurality of partial pseudonym values to a respective private key generator (PKG), wherein at least two of the partial pseudonym values being sent to respective different PKGs; and
   for each partial pseudonym value, receiving by the first computer entity, from the respective PKG a respective private key component.

2. The method of claim 1 further comprising combining, by the first computer entity, the private key components to obtain a private key corresponding to the public key.

3. The method of claim 1, wherein:
the public key is a sum of the partial pseudonym values in an algebraic group; and
the private key is the sum of the private key components in the algebraic group.

4. The method of claim 3, wherein each private key component is equal to an integer times the corresponding partial pseudonym value, the integer being a private key of the respective PKG.

5. The method of claim 1, wherein the first computer entity is installed on a vehicle, and the first computer entity and the PKGs are part of a connected vehicle system.

6. A system comprising:
a non-transitory memory; and
one or more hardware processors coupled to the non-transitory memory and configured to read instructions from the non-transitory memory to cause the system to perform a method comprising:
generating, a pseudonym value hiding an identity of the first computer entity, the pseudonym value corresponding to a public key for a public key cryptographic scheme;
obtaining from the pseudonym value a plurality of partial pseudonym values, wherein the pseudonym value is not computable from any single one of the partial pseudonym values;
sending each of the plurality of partial pseudonym values to a respective private key generator (PKG), wherein at least two of the partial pseudonym values being sent to respective different PKGs;
for each partial pseudonym value, receiving from the respective PKG a respective private key component.

7. The of claim 6 wherein the method further comprises combining the private key components to obtain a private key corresponding to the public key.

8. The first computer system of claim 6, wherein:
the public key is a sum of the partial pseudonym values in an algebraic group; and
the private key is the sum of the private key components in the algebraic group.

9. The system of claim 8, wherein each private key component is equal to an integer times the corresponding partial pseudonym value, the integer being a private key of the respective PKG.

10. The system of claim 7, wherein the system is configured for use as at least part of a vehicle's on-board equipment, for the vehicle to be part of a connected vehicle system.

11. A method comprising:
generating, by a first computer entity installed on a vehicle in a connected vehicle system, a unique value to identify the vehicle in communications in the connected vehicle system, the unique value corresponding to a public key for a public key cryptographic scheme;
generating, by the first computer entity, a plurality of partial values whose combination provides the unique value, wherein the unique value is not computable from any single one of the partial values;
sending, by the first computer entity, each of the plurality of partial values to a respective private key generator (PKG), wherein at least two of the partial values being sent to respective different PKGs; and
for each partial value, receiving by the first computer entity, from the respective PKG a respective private key component.

12. The method of claim 11 further comprising combining, by the first computer entity, the private key components to obtain a private key corresponding to the public key.

13. The method of claim 12, wherein the unique value is the public key.

14. The method of claim 12, wherein:
the public key is a sum of the partial values in an algebraic group; and
the private key is the sum of the private key components in the algebraic group.

15. The method of claim 14, wherein each private key component is equal to an integer times the corresponding partial value, the integer being a private key of the respective PKG.

16. The method of claim 12, wherein the first computer entity is installed on a vehicle, and the first computer entity and the PKGs are part of a connected vehicle system.

17. A computer system configured to be installed on a vehicle which is part of a connected vehicle system, the computer system comprising:
a non-transitory memory; and
one or more hardware processors coupled to the non-transitory memory and configured to read instructions from the non-transitory memory to cause the computer system to perform a method comprising:
generating, a unique value to identify the vehicle in communications in the connected vehicle system, the unique value corresponding to a public key for a public key cryptographic scheme; and
generating a plurality of partial values whose combination provides the unique value, wherein the unique value is not computable from any single one of the partial values;
sending, each of the plurality of partial values to a respective private key generator (PKG), wherein at least two of the partial values being sent to respective different PKGs;
for each partial value, receiving from the respective PKG a respective private key component.

18. The computer system of claim 17, wherein the method further comprises combining the private key components to obtain a private key corresponding to the public key.

19. The first computer system of claim 17, wherein:
the public key is a sum of the partial values in an algebraic group; and
the private key is the sum of the private key components in the algebraic group.

20. The computer system of claim 17, wherein each private key component is equal to an integer times the corresponding partial value, the integer being a private key of the respective PKG.

* * * * *